(12) United States Patent
Kumagai et al.

(10) Patent No.: US 10,561,246 B2
(45) Date of Patent: Feb. 18, 2020

(54) SEAT PAD

(71) Applicant: BRIDGESTONE CORPORATION, Tokyo (JP)

(72) Inventors: Kenji Kumagai, Tokyo (JP); Yoshiyuki Takahashi, Tokyo (JP); Toshimitsu Shinohara, Tokyo (JP); Taisuke Yonezawa, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 15/571,595

(22) PCT Filed: Apr. 19, 2016

(86) PCT No.: PCT/JP2016/062392
§ 371 (c)(1),
(2) Date: Nov. 3, 2017

(87) PCT Pub. No.: WO2016/190003
PCT Pub. Date: Dec. 1, 2016

(65) Prior Publication Data
US 2018/0132620 A1   May 17, 2018

(30) Foreign Application Priority Data

May 28, 2015   (JP) ................. 2015-108150

(51) Int. Cl.
*A47C 7/18*   (2006.01)
*A47C 27/14*   (2006.01)
(Continued)

(52) U.S. Cl.
CPC .............. *A47C 7/18* (2013.01); *A47C 27/14* (2013.01); *B60N 2/90* (2018.02); *B68G 5/02* (2013.01)

(58) Field of Classification Search
CPC .. A47C 27/14; A47C 7/18; A47C 7/02; A47C 7/022; A61G 5/1043; B60N 2/90;
(Continued)

(56) References Cited

U.S. PATENT DOCUMENTS 5,378,045 A * 1/1995 Siekman ............. A61G 5/1043
297/440.1
5,390,384 A   2/1995 Dinsmoor, III et al.
(Continued)

FOREIGN PATENT DOCUMENTS

CN   101854836 A   10/2010
CN   103909854 A   7/2014
(Continued)

OTHER PUBLICATIONS

Communication dated Mar. 23, 2018 from the European Patent Office in counterpart European application No. 16799711.3.
(Continued)

*Primary Examiner* — Mark R Wendell
(74) *Attorney, Agent, or Firm* — Sughrue Mion, PLLC (57) ABSTRACT

Provided is a seat pad (10) having a placing surface (11), wherein a lateral slit section (15) extending from an outer side toward an inner side of the seat pad (10) is formed in a first lateral direction (B1) along the placing surface (11), and at least a portion of the lateral slit section (15) gradually becomes smaller in a thickness direction (H) perpendicular to the placing surface (11) from the outer side toward the inner side of the seat pad (10) in the first lateral direction (B1).

9 Claims, 5 Drawing Sheets (51) Int. Cl.
*B68G 5/02* (2006.01)
*B60N 2/90* (2018.01)

(58) Field of Classification Search
CPC ........ B60N 2/44; B60N 2/7094; B60N 2/646;
B60N 2/70; B68G 5/02
USPC ............ 297/452.58, 452.23, 0.26, 0.27, 0.28
See application file for complete search history.

(56) References Cited

U.S. PATENT DOCUMENTS

| | | | |
|---|---|---|---|
| 5,513,899 A * | 5/1996 | Michaels | A47C 7/021 297/452.41 |
| 7,373,678 B2 * | 5/2008 | Hetzel | A61G 5/1043 5/653 |
| 7,891,033 B2 * | 2/2011 | Loewenthal | A61G 5/1043 297/452.21 |
| 9,021,637 B1 * | 5/2015 | Whelan | A61G 5/1043 5/654 |
| 9,738,192 B2 * | 8/2017 | Hirata | B60N 2/01508 |
| 2005/0235423 A1 | 10/2005 | Hetzel et al. | |
| 2010/0102615 A1 | 4/2010 | Yamauchi | |
| 2010/0194171 A1 | 8/2010 | Hirata et al. | |
| 2015/0072107 A1 | 3/2015 | Fujita et al. | |
| 2018/0146787 A1 * | 5/2018 | Kumagai | A47C 27/14 |
| 2018/0146788 A1 * | 5/2018 | Kumagai | A47C 27/14 |
| 2018/0257526 A1 * | 9/2018 | Kumagai | B60N 2/90 |

FOREIGN PATENT DOCUMENTS

| | | |
|---|---|---|
| CN | 104441382 A | 3/2015 |
| EP | 3 011 870 A1 | 4/2016 |
| JP | 8197994 A | 8/1996 |
| JP | 11-056521 A | 3/1999 |
| JP | 2006-149466 A | 6/2006 |
| JP | 2008001214 A | 1/2008 |
| JP | 2014-226181 A | 12/2014 |
| JP | 2015-039556 A | 3/2015 |
| WO | 2004/034853 A1 | 4/2004 |
| WO | 2014/203890 A1 | 12/2014 |

OTHER PUBLICATIONS

International Search Report for PCT/JP2016/062392, dated Jul. 26, 2016.
Communication dated Jan. 3, 2019 from the State Intellectual Property Office of the P.R.C., in application No. 201680030347.8.
Search Report dated Jul. 23, 2019 in Chinese Application No. 201680030347.8.

* cited by examiner

SEAT PAD

This application is a National Stage of International Application No. PCT/JP2016/062392 filed Apr. 19, 2016, claiming priority based on Japanese Patent Application No. 2015-108150 filed May 28, 2015, the contents of all of which are incorporated herein by reference in their entirety.

TECHNICAL FIELD

The present invention relates to a seat pad.

Priority is claimed on Japanese Patent Application No. 2015-108150, filed May 28, 2015, the content of which is incorporated herein by reference.

BACKGROUND ART

In the related art, for example, a seat pad disclosed in the following Patent Document 1 is known.

CITATION LIST

Patent Document

[Patent Document 1]
Japanese Unexamined Patent Application, First Publication No. 2006-149466

SUMMARY OF INVENTION

Technical Problem

However, in the seat pad of the related art, there is a room for improvement in sitting comfort (stroke feeling) such that the seat pad can be appropriately bent upon sitting and a stable posture can be held.

In consideration of the above-mentioned circumstances, the present invention is directed to improve sitting comfort.

Solution to Problem

A seat pad according to the present invention is a seat pad having a placing surface, wherein a lateral slit section extending from an outer side toward an inner side of the seat pad is formed in a first lateral direction along the placing surface, and at least a portion of the lateral slit section gradually becomes smaller in a thickness direction perpendicular to the placing surface from the outer side toward the inner side of the seat pad in the first lateral direction.

Effects of Invention

According to the present invention, sitting comfort can be improved.

DESCRIPTION OF EMBODIMENTS

First Embodiment

Hereinafter, a seat pad 10 according to a first embodiment of the present invention will be described with reference to FIGS. 1 to 4.

Figure 1:
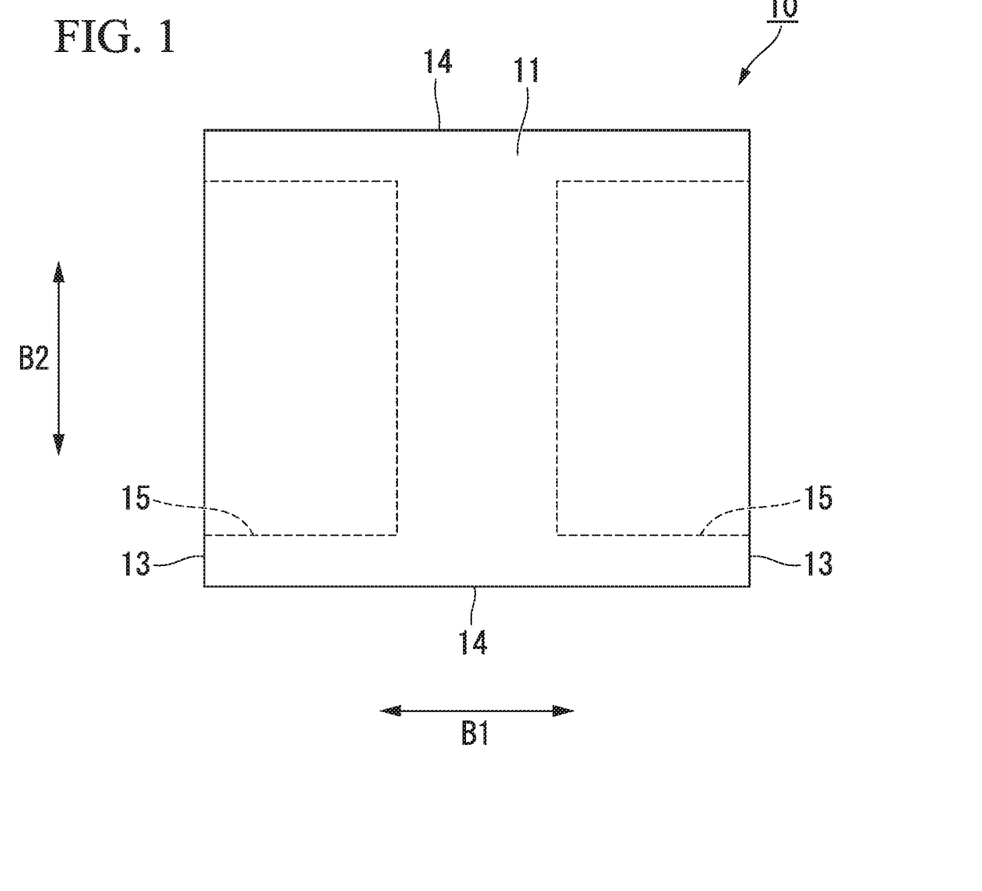
FIG. 1 is a plan view of a seat pad according to a first embodiment of the present invention.
Figure 2:
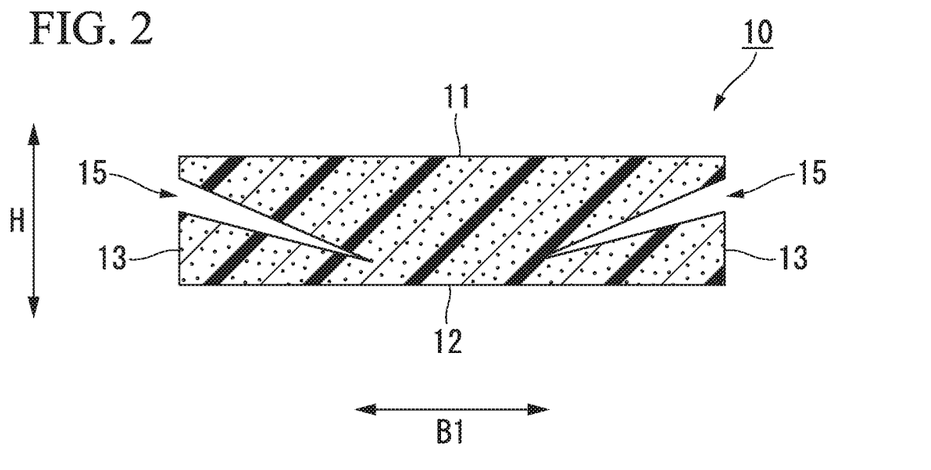
FIG. 2 is a cross-sectional view of the seat pad shown in FIG. 1.

As shown in FIGS. 1 and 2, the seat pad 10 is formed of a foamed molded body. The foamed molded body may be a soft resin foamed molded body molded by foaming a resin material, for example, soft polyurethane foam (soft resin) or the like. In an example shown, the seat pad 10 is integrally formed of the same material.

The seat pad 10 is employed in a seat (a cockpit) attached to, for example, an automobile (a vehicle). The seat pad 10 includes a sitting surface 11 (a placing surface) with which an occupant who sits on the seat comes in contact. In the embodiment, a cushion pad or a back pad may be employed as the seat pad 10.

Further, when a cushion pad is used as the seat pad 10, in a state in which the seat pad 10 is attached to the automobile, the sitting surface 11 is directed upward in a vertical direction, and a weight of an occupant is applied to the seat pad 10 from above. In addition, when a back pad is employed as the seat pad 10, in a state in which the seat pad 10 is attached to the automobile, the sitting surface 11 is directed toward a front side of the automobile, and the weight of an occupant is applied to the seat pad 10 from the front side.

The seat pad 10 is formed in a flat rectangular parallelepiped shape, and a direction of the seat pad 10 perpendicular to the sitting surface 11 is a thickness direction H of the seat pad 10. A surface of the seat pad 10 directed toward a side opposite to the sitting surface (a side opposite to a placing surface) in the thickness direction H is an attachment surface 12 (a back surface) of the seat pad 10.

The seat pad 10 is formed in a rectangular shape extending in a first lateral direction B1 and a second lateral direction B2 (a restricting direction) that are perpendicular to each other along the sitting surface 11 when seen in a plan view of the seat pad 10. Side surfaces of the seat pad 10 include a first side surface 13 extending in a direction perpendicular to the first lateral direction B1 and a second side surface 14 extending in a direction perpendicular to the second lateral direction B2. Further, the first lateral direction B1 may be, for example, a leftward/rightward direction of the automobile or a forward/rearward direction of the vehicle.

Lateral slit sections 15 extending from an outer side toward an inner side of the seat pad 10 in the first lateral direction B1 are formed in the seat pad 10. The lateral slit sections 15 are formed at portions of the seat pad 10 disposed on both sides in the first lateral direction B1, and not formed at a central portion of the first lateral direction B1. The lateral slit sections 15 extend from the outer side toward the inner side of the seat pad 10 when seen in a plan view of the seat pad 10.

End portions of the lateral slit sections 15 on an outer side in the first lateral direction B1 are open at back surfaces of the seat pad 10, and end portions of the lateral slit sections 15 inside in the first lateral direction B1 are not open at surfaces of the seat pad 10. The lateral slit sections 15 are open at the first side surface 13 and extend inward from the first side surface 13 in the first lateral direction B1.

The sizes of the lateral slit sections 15 in the first lateral direction B1 are equal to each other throughout the length in the second lateral direction B2. The lateral slit sections 15 are smaller than the seat pad 10 in the second lateral direction B2 and are not open at the second side surface 14. The sizes of the lateral slit sections 15 in the second lateral direction B2 are, for example, about 10 to 25 mm.

As shown in FIG. 2, the lateral slit sections 15 gradually extend inward in the first lateral direction B1 and toward a side opposite to the sitting surface in the thickness direction H. At least portions of the lateral slit sections 15 gradually become smaller in the thickness direction H from the outer side toward the inner side of the seat pad 10 in the first lateral direction B1. In the example shown, the lateral slit sections 15 are gradually reduced in the thickness direction H from the outer side toward the inner side of the seat pad 10 throughout the length in the first lateral direction B1. Each of the lateral slit sections 15 formed in a triangular shape that narrows inward in the first lateral direction B1 in a cross-sectional view when the seat pad 10 is seen from the second lateral direction B2.

Figure 3:
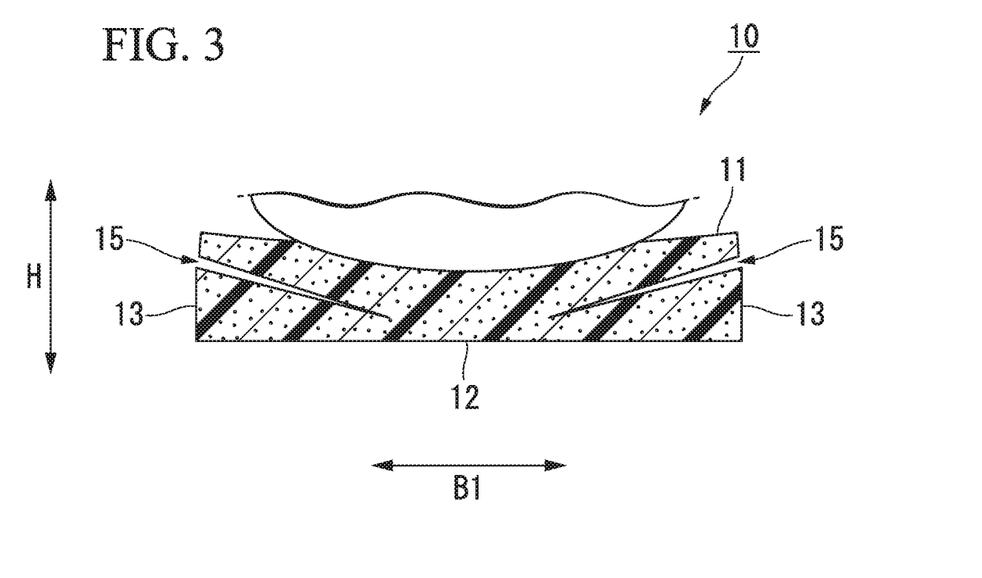
FIG. 3 is a cross-sectional view of the seat pad shown in FIG. 1, showing a state in which an occupant is seated.

As described above, according to the seat pad 10 of the embodiment, the lateral slit sections 15 extending from the outer side toward the inner side of the seat pad 10 are formed in the seat pad 10 in the first lateral direction B1. Accordingly, as shown in FIG. 3, when an occupant sits on the sitting surface 11, as the seat pad 10 is deformed to narrow the lateral slit sections 15 in the thickness direction H, the seat pad 10 can be appropriately bent while minimizing hardness felt from the seat pad 10, and sitting comfort upon, for example, sitting, cornering, or the like, can be improved.

Figure 4:
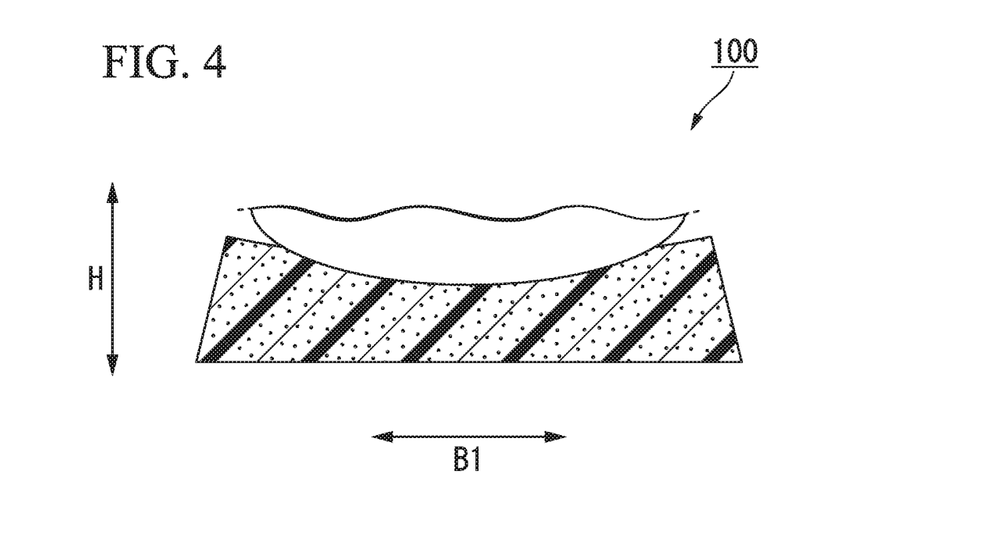
FIG. 4 is a cross-sectional view of a seat pad according to a comparative example of the present invention, showing a state in which an occupant is seated.

Further, as shown in FIG. 4, in the seat pad 100 in which the lateral slit sections 15 are not formed, when an occupant sits, a stretching feeling occurs in a central portion in the first lateral direction B1 having a large load.

Further, at least portions of the lateral slit sections 15 are gradually reduced in the thickness direction H from the outer side toward the inner side of the seat pad 10 in the first lateral direction B1. Accordingly, portions of the lateral slit sections 15 having a relatively large size in the thickness direction H can be disposed at portions of the sitting surface 11 disposed at outer sides of the seat pad 10 to which a load cannot be easily applied when an occupant sits. Accordingly, the seat pad 10 can be bent within a wide area of the sitting surface 11 with a small deviation, and sitting comfort can be further improved.

In addition, since the lateral slit sections 15 are gradually reduced in the thickness direction H from the outer side toward the inner side of the seat pad 10 throughout the length in the first lateral direction B1, the level of deformation of the seat pad 10 can be gradually changed in the first lateral direction B1, and the occurrence of discomfort when the seat pad 10 is bent can be effectively minimized.

Second Embodiment

Figure 5:
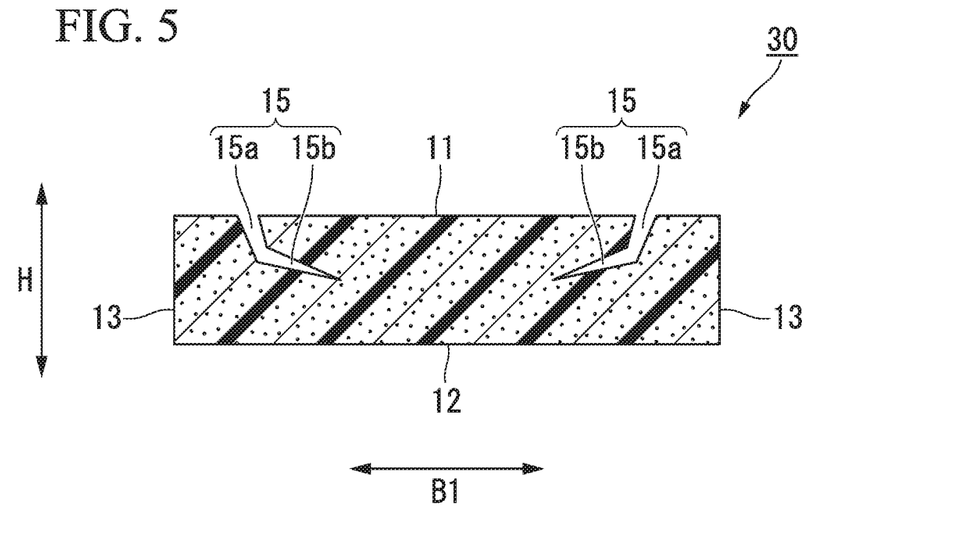
FIG. 5 is a cross-sectional view of a seat pad according to a second embodiment of the present invention.

Next, a seat pad 30 of a second embodiment according to the present invention will be described with reference to FIG. 5.

Further, components in the second embodiment the same as those in the first embodiment are designated by the same reference numerals, a detailed description thereof will be omitted, and different points will be mainly described.

In the seat pad 30 according to the embodiment, each of the lateral slit sections 15 has a steep slope section 15a disposed on an outer side in the first lateral direction B1 and a gentle slope section 15b disposed on an inner side in the first lateral direction B1, which are connected to each other in the first lateral direction B1. The lateral slit sections 15 are open at the sitting surface 11.

Third Embodiment

Next, a seat pad 70 of a third embodiment according to the present invention will be described with reference to FIGS. 6 to 8.

Further, components in the third embodiment the same as those in the first embodiment are designated by the same reference numerals, a detailed description thereof will be omitted, and different points will be mainly described.

Figure 6:
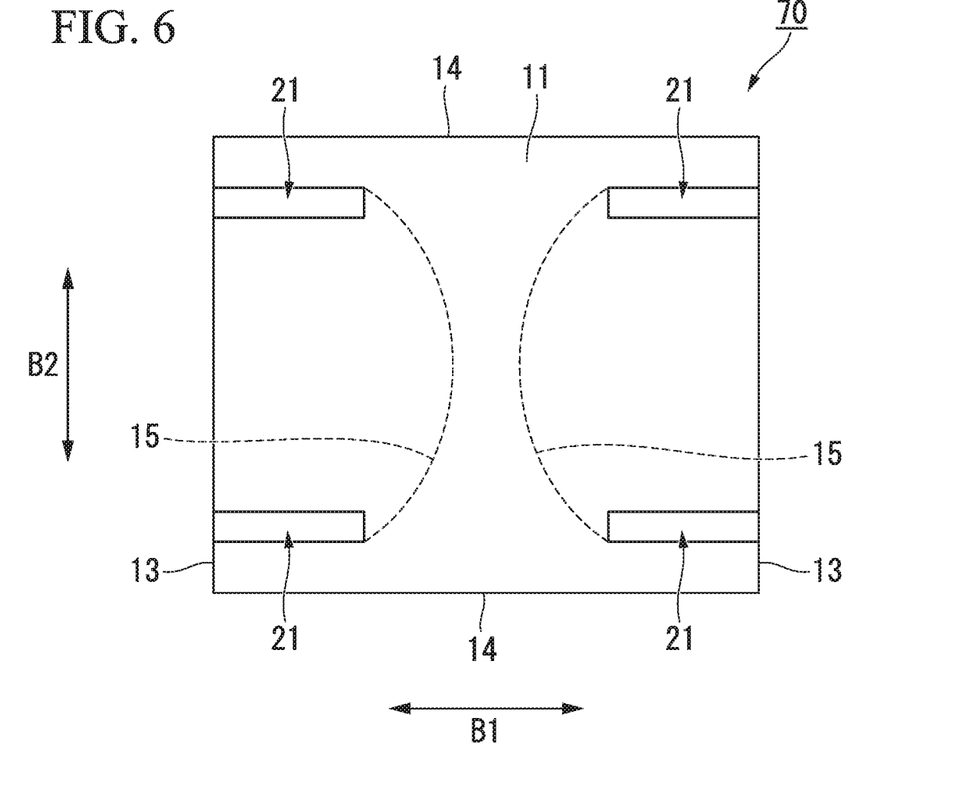
FIG. 6 is a plan view of a seat pad according to a third embodiment of the present invention.

As shown in FIG. 6, in the seat pad 70 according to the embodiment, the lateral slit sections 15 are gradually elongated in the first lateral direction B1 from the outer side toward the inner side in the second lateral direction B2. End portions of the lateral slit sections 15 inside in the first lateral direction B1 are curved to protrude inward in the first lateral direction B1 when seen in a plan view of the seat pad 70.

Figure 8:
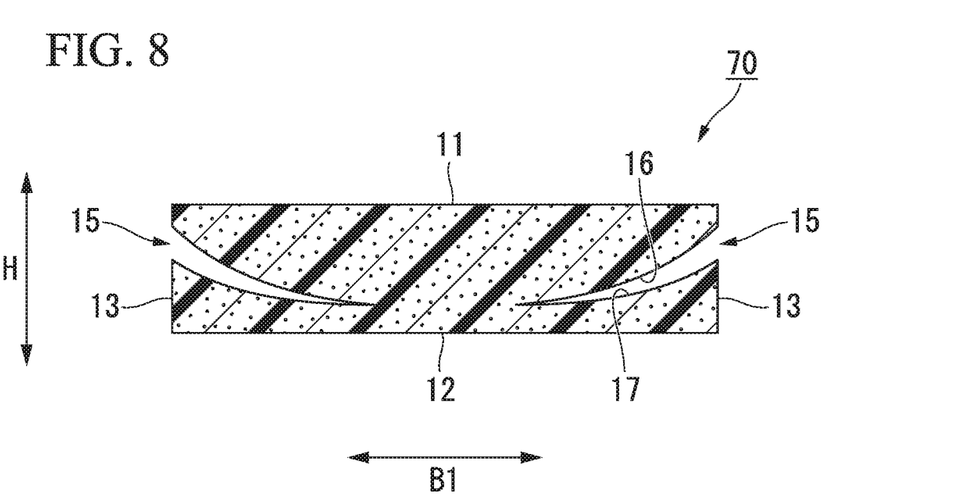
FIG. 8 is a cross-sectional view of the seat pad shown in FIG. 6.

As shown in FIG. 8, the lateral slit sections 15 are curved to be convex in the thickness direction H. In the example shown, the lateral slit sections 15 are curved to protrude toward a side opposite to the sitting surface in the thickness direction H. End portions of the lateral slit sections 15 on the inner sides in the first lateral direction B1 are disposed closer to a side opposite to the sitting surface in the thickness direction H than end portions of the lateral slit sections 15 on the outer sides in the first lateral direction B1. The lateral slit sections 15 are curved along an appearance of an occupant who sits on the seat.

Figure 7:
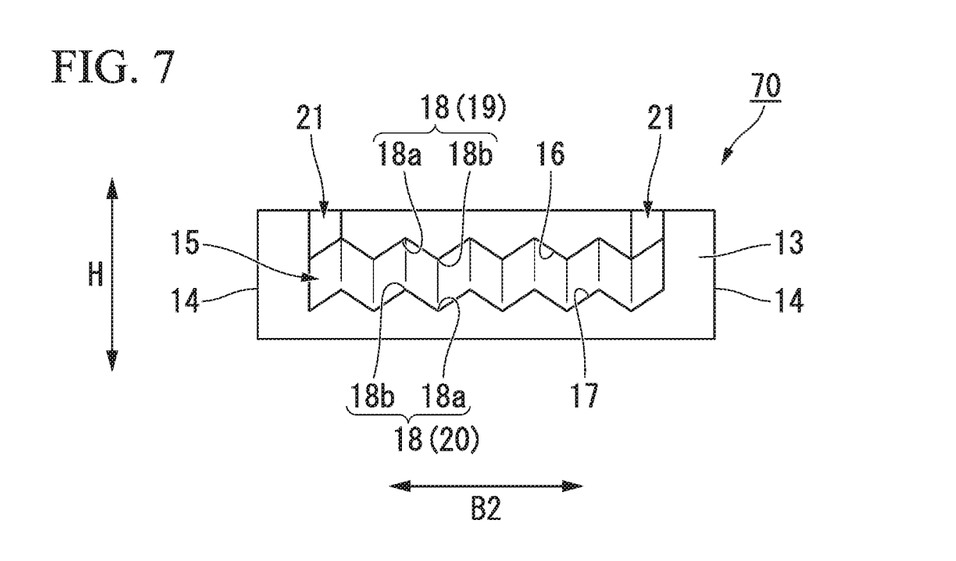
FIG. 7 is a side view of the seat pad shown in FIG. 6.

As shown in FIG. 7, in the inner surfaces that divide the lateral slit sections 15, concavo-convex sections 18 continuous with each other in the second lateral direction B2 are formed in a first inner surface 16 disposed at the sitting surface 11 side in the thickness direction H and a second inner surface 17 disposed at a side opposite to the sitting surface in the thickness direction H, respectively. A concave section 18a and a convex section 18b that constitute each of the concavo-convex sections 18 extend in the first lateral direction B1. The concave section 18a and the convex section 18b are formed in a triangular shape in a front view when seen from the first lateral direction B1.

In a first concavo-convex section 19 that is the concavo-convex section 18 formed on the first inner surface 16 and a second concavo-convex section 20 that is the concavo-convex section 18 formed on the second inner surface 17, in a front view when seen from the first lateral direction B1, wave forms formed by surfaces thereof are identical to each other. In the wave forms formed by the surfaces of the first concavo-convex section 19 and the second concavo-convex section 20, periods in the second lateral direction B2 and amplitudes in the thickness direction H are identical to each other. In the first concavo-convex section 19 and the second concavo-convex section 20, the concave section 18a and the convex section 18b thereof face each other in the thickness direction H.

As shown in FIGS. 6 and 7, longitudinal slit sections 21 extending from the lateral slit sections 15 toward the sitting surface 11 in the thickness direction H are formed in the end portions of the lateral slit sections 15 in the second lateral direction B2. The longitudinal slit sections 21 are formed in both end portions of the lateral slit sections 15 in the second lateral direction B2. The longitudinal slit sections 21 are formed throughout the lengths of the lateral slit sections 15 in the first lateral direction B1. Each of the longitudinal slit sections 21 is formed in a linear shape extending in the first lateral direction B1 when seen in a plan view of the seat pad 70. The longitudinal slit sections 21 extend from the lateral slit sections 15 to the sitting surface 11 and are open at the sitting surface 11 throughout the length in the first lateral direction B1.

As described above, according to the seat pad 70 of the embodiment, since the lateral slit sections 15 are curved to be convex in the thickness direction H, the lateral slit sections 15 can easily conform an appearance of an occupant who sits on the sitting surface 11. Accordingly, the seat pad 70 can bend along the outline of the occupant, whereby a fitting feeling can be improved and sitting comfort increased.

Further, like the embodiment, when the lateral slit sections 15 are curved to protrude toward a side opposite to the sitting surface in the thickness direction H, the seat pad 70 can be effectively bent along the appearance of the occupant, and fit feeling can be further increased to improve sitting comfort.

In addition, the longitudinal slit sections 21 are formed at the end portions of the lateral slit sections 15 in the second lateral direction B2. Accordingly, when the occupant sits on the sitting surface 11, portions of the seat pad 70 disposed between the sitting surface 11 and the lateral slit sections 15 (hereinafter, referred to as "a pressure receiving and deforming section") can be expanded and deformed outward in the second lateral direction B2 such that the longitudinal slit sections 21 are narrowed in the second lateral direction B2. Accordingly, the seat pad 70 can be deformed to enwrap the occupant on the sitting surface 11 from the outside in the second lateral direction B2, and sitting comfort can be further improved.

Further, like the embodiment, when the lateral slit sections 15 and the longitudinal slit sections 21 are open at the surface of the seat pad 70, the pressure receiving and deforming section of the seat pad 70 can be easily deformed independently from the other portion. Accordingly, when cores that form the lateral slit sections 15 in a mold that forms the seat pad 70 are separated from the seat pad 70, application of an excessive load applied to the pressure receiving and deforming section due to active deformation of the pressure receiving and deforming section can be suppressed, and the seat pad 70 can be conveniently and accurately formed.

In addition, since the concave section 18a and the convex section 18b of the first concavo-convex section 19 and the second concavo-convex section 20 face each other in the thickness direction H, when the occupant sits on the sitting surface 11 and the lateral slit sections 15 are narrowed in the thickness direction H, the first concavo-convex section 19 and the second concavo-convex section 20 can be fitted to each other. Accordingly, relative displacement in the second lateral direction B2 of portions of the seat pad 70 disposed at both sides with the lateral slit sections 15 sandwiched therebetween in the thickness direction H when the occupant sits on the seat can be suppressed, and sitting comfort can be further improved.

In addition, the lateral slit sections 15 are gradually elongated in the first lateral direction B1 from the outer side toward the inner side in the second lateral direction B2. Accordingly, portions of the sitting surface 11 on which central portions of the lateral slit sections 15 in the second lateral direction B2 are disposed can be more actively deformed that the portions of the lateral slit sections 15 on which both end portions in the second lateral direction B2 are disposed. Accordingly, the seat pad 70 can be deformed to enwrap the occupant on the sitting surface 11 from the outside in the second lateral direction B2, and sitting comfort can be further improved.

Fourth Embodiment

Figure 9:
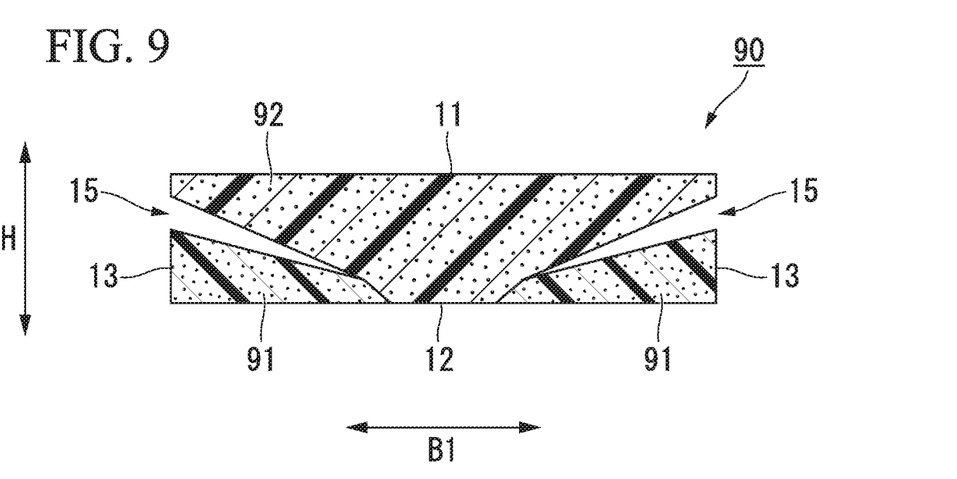
FIG. 9 is a cross-sectional view of a seat pad according to a fourth embodiment of the present invention.

Next, a seat pad 90 of a fourth embodiment according to the present invention will be described with reference to FIG. 9.

Further, components in the fourth embodiment the same as those in the first embodiment are designated by the same reference numerals, a detailed description thereof will be omitted, and different points will be mainly described.

The seat pad 90 according to the embodiment is integrally formed of different materials, and in the example shown, layers 91 and 92 having different hardnesses are stacked in the thickness direction H.

The seat pad 90 includes a base layer 91 on the attachment surface 12 side, and a cushion layer 92 on the sitting surface 11 side. The base layer 91 and the cushion layer 92 are divided by the lateral slit sections 15 in the thickness direction H, and a portion of the seat pad 90 disposed closer to the attachment surface 12 than the lateral slit sections 15 is the base layer 91, and a portion disposed closer to the sitting surface 11 than the lateral slit sections 15 is the cushion layer 92.

Then, in the embodiment, the sitting surface 11 is formed by the cushion layer 92, and the hardness of the cushion layer 92 is lower than the hardness of the base layer 91.

Further, in the example shown, the base layer 91 is disposed to be limited to both sides of the seat pad 90 in the first lateral direction B1, a central portion in the first lateral direction B1 being constituted by the cushion layer 92. That is, the cushion layer 92 is formed in a T shape protruding toward the attachment surface 12 in a cross-sectional view when the seat pad 10 is seen from the second lateral direction B2, and the base layer 91 is connected to a portion of the cushion layer 92 protruding toward the attachment surface 12 from both sides in the first lateral direction B1.

As described above, according to the seat pad 90 of the embodiment, since the base layer 91 and the cushion layer 92 are divided by the lateral slit sections 15 in the thickness direction H, when the occupant sits on the sitting surface 11 and the cushion layer 92 is deformed, deformation of the base layer 91 conforming to the cushion layer 92 can be minimized. Accordingly, the properties of the layers 91 and 92 are readily exhibited.

In addition, in this way, when the occupant sits on the seat, deformation of the base layer 91 following the cushion layer 92 can be suppressed, and further, in the embodiment, the lateral slit sections 15 are formed in portions of the seat pad 10 at both sides in the first lateral direction B1, respectively. Accordingly, when the occupant sits on the seat, occurrence of a stretching feeling (discomfort) in the central portion of the sitting surface 11 in the first lateral direction B1 to which a load is easily applied can be suppressed. Accordingly, properties of the layers 91 and 92 can be easily exhibited.

As described above, according to the seat pad 90 of the embodiment, since the properties of the layers 91 and 92 can be easily exhibited in the embodiment, the hardness of the cushion layer 92 is lower than the hardness of the base layer 91. Accordingly, a holding feeling with respect to an occupant can be secured by the base layer 91 while securing fit feeling with respect to the occupant by the cushion layer 92, and sitting comfort can be effectively improved.

Further, the technical area of the present invention is not limited to these embodiments, and various modifications may be made without departing from the spirit of the present invention.

For example, in the embodiment, while the seat pad 10, 30 or 70 is formed integrally of the same material, the present invention is not limited thereto. For example, the seat pad 10, 30 or 70 may be formed integrally of different materials.

In the embodiment, while the lateral slit sections 15 are formed in the portions of the seat pad 10, 30, 70 or 90 disposed at both sides in the first lateral direction B1, respectively, the present invention is not limited thereto. The lateral slit sections 15 may be formed at only one side in the first lateral direction B1.

The lateral slit sections 15 may be appropriately changed to other shapes in which one or a plurality of slit sections are formed.

In the embodiment, while the lateral slit sections 15 are open at the first side surface 13, the lateral slit sections 15 may not be open at the first side surface 13.

In the embodiment, while the concavo-convex sections 18 are continuous in the second lateral direction B2, the present invention is not limited thereto. For example, the concavo-convex section 18 may be continuous in the first lateral direction B1. These may be appropriately varied to another type in which concavo-convex sections 18 continuous in the restricting direction along the sitting surface 11 are formed in the first inner surface 16 and the second inner surface 17 of the lateral slit sections 15, respectively.

The seat pad 10, 30, 70 or 90 may be used as a subject in various applications such as cushioning materials for indoor chairs, bedding, or the like. Further, the seat pad 10, 30, 70 or 90 is not limited to a seat on which a person sits and may be used for a seat pad having a placing surface on which baggage or the like is placed.

According to the present invention, the lateral slit section extending from the outer side toward the inner side of the seat pad is formed in the seat pad in the first lateral direction. Accordingly, when an occupant sits on the placing surface, as the seat pad is deformed to narrow the lateral slit section in the thickness direction, the seat pad can be appropriately bent while minimizing hardness felt from the seat pad, and for example, sitting comfort during sitting, cornering, or the like, can be improved.

Further, at least a portion of the lateral slit section gradually becomes smaller in the thickness direction from the outer side toward the inner side of the seat pad in the first lateral direction. Accordingly, the portions of the lateral slit section having a relatively large size in the thickness direction can be disposed at a portion of the placing surface disposed at an outer side of the seat pad to which a load cannot be easily applied when the occupant sits on the seat. Accordingly, the seat pad can be bent throughout a wide area of the placing surface with small deviation, and sitting comfort can be further improved.

The lateral slit section may be gradually reduced in the thickness direction from the outer side toward the inner side of the seat pad throughout the length in the first lateral direction.

In this case, since the lateral slit section gradually becomes smaller in the thickness direction from the outer side toward the inner side of the seat pad throughout the length in the first lateral direction, the level of deformation of the seat pad can be gradually changed in the first lateral direction, and occurrence of discomfort when the seat pad is bent can be effectively minimized.

The lateral slit section may be curved to be convex in the thickness direction.

In this case, since the lateral slit section is curved to be convex in the thickness direction, the lateral slit section can easily conform an appearance of an occupant who sits on the placing surface. Accordingly, the seat pad can be bent along the appearance of the occupant, and fit feeling can be increased to improve sitting comfort.

Further, when the lateral slit section is curved to protrude toward a side opposite to the placing surface in the thickness direction, the seat pad can be effectively bent along the appearance of the occupant, and fit feeling can be further increased to improve sitting comfort.

The longitudinal slit section extending from the lateral slit section toward the placing surface in the thickness direction may be formed at the end portion of the lateral slit section in the second lateral direction perpendicular to the first lateral direction along the placing surface.

In this case, the longitudinal slit section is formed in the end portion of the lateral slit section in the second lateral direction.

Accordingly, when the occupant sits on the placing surface, the portion of the seat pad disposed between the placing surface and the lateral slit section (hereinafter, referred to as "a pressure receiving and deforming section") can be expanded and deformed outward in the second lateral direction such that the longitudinal slit section is narrowed in the second lateral direction. Accordingly, the seat pad can be deformed to enwrap the occupant on the placing surface from the outside in the second lateral direction, and sitting comfort can be further improved.

Further, when the lateral slit section and the longitudinal slit section are open at the surface of the seat pad, the pressure receiving and deforming section of the seat pad can be easily deformed independently from the other portion. Accordingly, when a core forming the lateral slit section in a mold forming the seat pad are separated from the seat pad, an excessive load applied to the pressure receiving and deforming section due to active deformation of the pressure receiving and deforming section can be suppressed, and the seat pad can be conveniently and accurately formed.

The concavo-convex sections that are continuous in the restricting direction along the placing surface are formed in the first inner surface disposed at the placing surface side in the thickness direction and the second inner surface disposed at a side opposite to the placing surface in the thickness direction in the inner surface that divides the lateral slit section, and the concave section and the convex section of the first concavo-convex section that is the concavo-convex section formed on the first inner surface and the second concavo-convex section that is the concavo-convex section formed on the second inner surface may face each other in the thickness direction.

In this case, since the concave section and the convex section of the first concavo-convex section and the second concavo-convex section face each other in the thickness direction, when the occupant sits on the placing surface and the lateral slit section is narrowed in the thickness direction, the first concavo-convex section and the second concavo-convex section can be fitted to each other. Accordingly, displacement of the portions of the seat pad disposed at both sides with the lateral slit section sandwiched therebetween in the thickness direction relative to the restricting direction when the occupant sits on the seat can be suppressed, and sitting comfort can be further improved.

The lateral slit section may be gradually elongated in the first lateral direction from the outer side toward the inner side in the second lateral direction perpendicular to the first lateral direction along the placing surface.

In this case, the lateral slit section is gradually elongated in the first lateral direction from the outer side toward the inner side in the second lateral direction. Accordingly, the portion of the placing surface on which the central portion of the lateral slit section in the second lateral direction is disposed can be more actively deformed than the portions of the lateral slit section on which both end portions in the second lateral direction are disposed. Accordingly, the seat pad can be deformed to enwrap the occupant on the placing surface from the outside in the second lateral direction, and sitting comfort can be further improved.

In addition, the components in the embodiments can be appropriately substituted with known components without departing from the spirit of the present invention, and the above-mentioned variants may be appropriately combined.

INDUSTRIAL APPLICABILITY

According to the present invention, sitting comfort can be improved.

REFERENCE SIGNS LIST 10, 30, 70, 90 Seat pad
11 Sitting surface (placing surface)
15 Lateral slit section
16 First inner surface
17 Second inner surface
18 Concavo-convex section
18a Concave section
18b Convex section
19 First concavo-convex section
20 Second concavo-convex section
21 Longitudinal slit section
B1 First lateral direction
B2 Second lateral direction
H Thickness direction

What is claimed is:

1. A seat pad having a placing surface and a side opposite to the placing surface,
   wherein a lateral slit section extending from an outer side toward an inner side of the seat pad is formed in a first lateral direction, which is a lateral direction of an occupant, along the placing surface,
   at least a portion of the lateral slit section gradually becomes smaller in a thickness direction perpendicular to the placing surface from the outer side toward the inner side of the seat pad in the first lateral direction,
   side surfaces of the seat pad include a first side surface extending in a direction perpendicular to the first lateral direction and a second side surface perpendicular to the first side surface, and
   the lateral slit section is open at only the first side surface of the seat pad and in a second lateral direction, and is not open at the second side surface and at the side opposite to the placing surface, and
   the lateral slit section extends in the second lateral direction when viewed from a direction perpendicular to a placing surface of the seat pad.

2. The seat pad according to claim 1, wherein the lateral slit section gradually becomes smaller in the thickness direction from the outer side toward the inner side of the seat pad throughout the length in the first lateral direction.

3. The seat pad according to claim 1, wherein the lateral slit section is curved to be convex in the thickness direction.

4. The seat pad according to claim 1, wherein a longitudinal slit section extending from the lateral slit section toward the placing surface in the thickness direction is formed in an end portion of the lateral slit section in the second lateral direction perpendicular to the first lateral direction along the placing surface.

5. The seat pad according to claim 1, wherein concavo-convex sections that are continuous in a restricting direction along the placing surface are formed on a first inner surface disposed at the placing surface side in the thickness direction and a second inner surface disposed at a side opposite to the placing surface in the thickness direction in an inner surface that divides the lateral slit section, and
   a concave section and a convex section of a first concavo-convex section that is the concavo-convex section formed on the first inner surface and a second concavo-convex section that is the concavo-convex section formed on the second inner surface face each other in the thickness direction.

6. The seat pad according to claim 1, wherein the lateral slit section is gradually elongated in the first lateral direction from the outer side toward the inner side in the second lateral direction perpendicular to the first lateral direction along the placing surface.

7. A seat pad having a placing surface,
   wherein a lateral slit section extending from an outer side toward an inner side of the seat pad is formed in a first lateral direction, which is a lateral direction of an occupant, along the placing surface,
   at least a portion of the lateral slit section gradually becomes smaller in a thickness direction perpendicular to the placing surface from the outer side toward the inner side of the seat pad in the first lateral direction,
   side surfaces of the seat pad include a first side surface extending in a direction perpendicular to the first lateral direction and a second side surface perpendicular to the first side surface, and
   the lateral slit section is open at the first side surface of the seat pad and in a second lateral direction, and is not open at the second side surface,
   wherein the lateral slit section is curved to be convex in the thickness direction.

8. A seat pad having a placing surface,
   wherein a lateral slit section extending from an outer side toward an inner side of the seat pad is formed in a first lateral direction, which is a lateral direction of an occupant, along the placing surface,
   at least a portion of the lateral slit section gradually becomes smaller in a thickness direction perpendicular to the placing surface from the outer side toward the inner side of the seat pad in the first lateral direction,
   side surfaces of the seat pad include a first side surface extending in a direction perpendicular to the first lateral direction and a second side surface perpendicular to the first side surface, and
   the lateral slit section is open at the first side surface of the seat pad and in a second lateral direction, and is not open at the second side surface,
   wherein a longitudinal slit section extending from the lateral slit section toward the placing surface in the thickness direction is formed in an end portion of the lateral slit section in the second lateral direction perpendicular to the first lateral direction along the placing surface.

9. A seat pad having a placing surface, wherein a lateral slit section extending from an outer side toward an inner side of the seat pad is formed in a first lateral direction, which is a lateral direction of an occupant, along the placing surface, at least a portion of the lateral slit section gradually becomes smaller in a thickness direction perpendicular to the placing surface from the outer side toward the inner side of the seat pad in the first lateral direction, side surfaces of the seat pad include a first side surface extending in a direction perpendicular to the first lateral direction and a second side surface perpendicular to the first side surface, and the lateral slit section is open at the first side surface of the seat pad and in a second lateral direction, and is not open at the second side surface, wherein concavo-convex sections that are continuous in a restricting direction along the placing surface are formed on a first inner surface disposed at the placing surface side in the thickness direction and a second inner surface disposed at a side opposite to the placing surface in the thickness direction in an inner surface that divides the lateral slit section, and a concave section and a convex section of a first concavo-convex section that is the concavo-convex section formed on the first inner surface and a second concavo-convex section that is the concavo-convex section formed on the second inner surface face each other in the thickness direction.

\* \* \* \* \*